United States Patent [19]

Skoff

[11] Patent Number: 5,472,378
[45] Date of Patent: Dec. 5, 1995

[54] VENTILATION SYSTEM FOR THE CREW CABIN OF A COMBAT VEHICLE

[75] Inventor: Gerhard Skoff, Vienna, Austria

[73] Assignee: Steyr-Daimler-Puch AG, Vienna, Austria

[21] Appl. No.: 284,810

[22] Filed: Aug. 2, 1994

[30] Foreign Application Priority Data

Aug. 4, 1993 [AT] Austria .................................... 1559/93

[51] Int. Cl.⁶ .................................................... B60H 3/06
[52] U.S. Cl. ........................ 454/141; 454/151; 454/158; 454/906; 180/68.1
[58] Field of Search ................... 454/70, 75, 84, 454/141, 151, 158, 906; 180/68.1

[56] References Cited

U.S. PATENT DOCUMENTS

| | | | |
|---|---|---|---|
| T986,006 | 9/1979 | Simmons | 454/141 |
| 1,660,269 | 2/1928 | Knox et al. | 454/158 |
| 2,666,497 | 1/1954 | Weber | 454/84 |
| 2,853,153 | 9/1958 | Sexton . | |
| 3,286,617 | 11/1966 | Shirk | 454/906 X |
| 4,724,748 | 2/1988 | Geyer | 454/906 X |
| 4,870,895 | 10/1989 | Mayer | 454/141 X |

FOREIGN PATENT DOCUMENTS 897236  5/1962  United Kingdom ................... 454/141

Primary Examiner—Harold Joyce
Attorney, Agent, or Firm—Meltzer, Lippe, Goldstein et al.

[57] ABSTRACT

A system for the ventilation of the crew cabin of a combat vehicle having an engine room (5) separated from the crew cabin (2) in which a radiator (9) having a suction, cooling blower (10) is located. The ventilation system comprises an air suction and cleaning apparatus (12,13,15) having a ventilator (14) and an air distribution channel (16) having blower openings (17) into the crew cabin. Advantageously, a sealable passage opening (20) is provided between the crew cabin (2) and the engine room (5).

9 Claims, 2 Drawing Sheets

VENTILATION SYSTEM FOR THE CREW CABIN OF A COMBAT VEHICLE

FIELD OF THE INVENTION

The present invention relates to a system for the ventilation of the crew cabin of a combat vehicle having an engine room containing a cooler with an aspirating cooling blower separate from the crew cabin. More specifically, it relates to a ventilation system comprising an air suction and cleaning device having a ventilator and an air distribution channel having blowing nozzles in the crew cabin.

BACKGROUND OF THE INVENTION

In combat vehicles, providing ventilation of the crew cabin is difficult in several respects: the air supplied from the outside by means of a ventilator must be cleaned mechanically and chemically because it may contain traces of combat gas, thereby producing a considerable drop in the pressure; the air must be distributed in the interior of the crew cabin in an aimed manner requiring air guiding channels, e.g., going to the driver; the crew which is contained in narrow quarters has a considerable air requirement and, furthermore, firing may be necessary from the crew cabin in grenadier vehicles, necessitating, a high air throughput; and, finally, the air must also leave the crew cabin again, in the case of an open, as well as closed, combat room, which constitutes a special difficulty in the case of ABC (Atomic (Nuclear), Bacteriological Chemicals)-proof vehicles.

No known system meets all of these requirements. Known systems with exhaust blowers need an enormous amount of blower capacity to ensure sufficient air supply and cannot produce any air stream directed on the individual consumers. Furthermore, suction through a filter is only possible with an air-tight crew cabin. Also, with ventilation by means of pressure blowers, the blower output is still so high that a radial blower must be used which takes up a lot of the limited interior space. When the combat room is closed, an outlet opening, which can be closed, also must be available. Systems with pressure blowers and suction blowers come closest to meeting the requirements, but they need two blowers and this type of system is fraught with high costs, expensive controls and a loss of structural space.

A combat vehicle is known from U.S. Pat. No. 2,853,153 which discloses an engine contained in a separate space. The engine sucks its combustion air through a filter selectively either from the combat room or from the engine room. However, in this process, the non-cleaned air is sucked into the combat room, which requires an open hatch and does not permit individual delivery of the air to the personnel. The filter has a coarse collector and the particles thus caught are sucked through an opening by the cooling blower of the engine. The opening cannot be closed.

It is therefore an object of the present invention to create a ventilation system which avoids the above-mentioned disadvantages and meets all the requirements at a low technological cost.

SUMMARY OF THE INVENTION

This and other objectives are achieved according to the invention. A ventilation system for the crew cabin of a combat vehicle is provided. The combat vehicle has an engine room which is separated from the crew cabin. A radiator is located in the engine room. A suction, cooling blower is connected to the output of the radiator. An air suction and cleaning apparatus is located in the crew cabin. The air suction and cleaning apparatus has a ventilator and an input for sucking in fresh air from the outside. An air distribution channel is located in the crew cabin and is connected to an output of the air suction and cleaning apparatus. A plurality of air blowing nozzles are disposed on the air distribution channel for delivering fresh air to the crew cabin. A sealable passage opening is located between the crew cabin and the engine room. This passage selectively conveys used air from the crew cabin to the engine room.

A passage opening which can be closed between the crew cabin and the engine room is provided. The fact that a very, strong sucking, cooling blower is already being used in the engine room to ensure engine cooling so that a considerable underpressure prevails in the engine room is taken advantage of here. This underpressure sucks the used air out of the crew cabin and lowers the pressure therein. The blower is, as a rule, controlled by a thermostat, so that the ventilation of the crew cabin is also increased in case of a higher thermal load. It is, therefore, possible to make do with a ventilator having a low pressure level at the air inlet into the crew cabin where air cleaning also takes place. When the vehicle is open, this ventilator can even be shut off completely and the underpressure in the engine room suffices to suck away gunpowder gases which are released when firing from the crew cabin.

The structural space requirements are especially low if the ventilator is an axial ventilator. This is made possible by the low required conveying pressure based on the invention.

In a preferred embodiment of the ventilation system, a sound absorber follows the passage opening, thereby keeping the noise in the engine room away from the crew.

In a further preferred embodiment, a flap which closes automatically when overpressure occurs in the engine room and when the engine is shut off is provided to close the passage opening. This protects the crew from the entry of engine gases in the case of an explosion in the engine room, as well as when the engine is stopped.

BRIEF DESCRIPTION OF THE DRAWINGS

The invention is described below in a preferred embodiment through the following drawings.

DETAILED DESCRIPTION OF THE INVENTION

Figure 1:
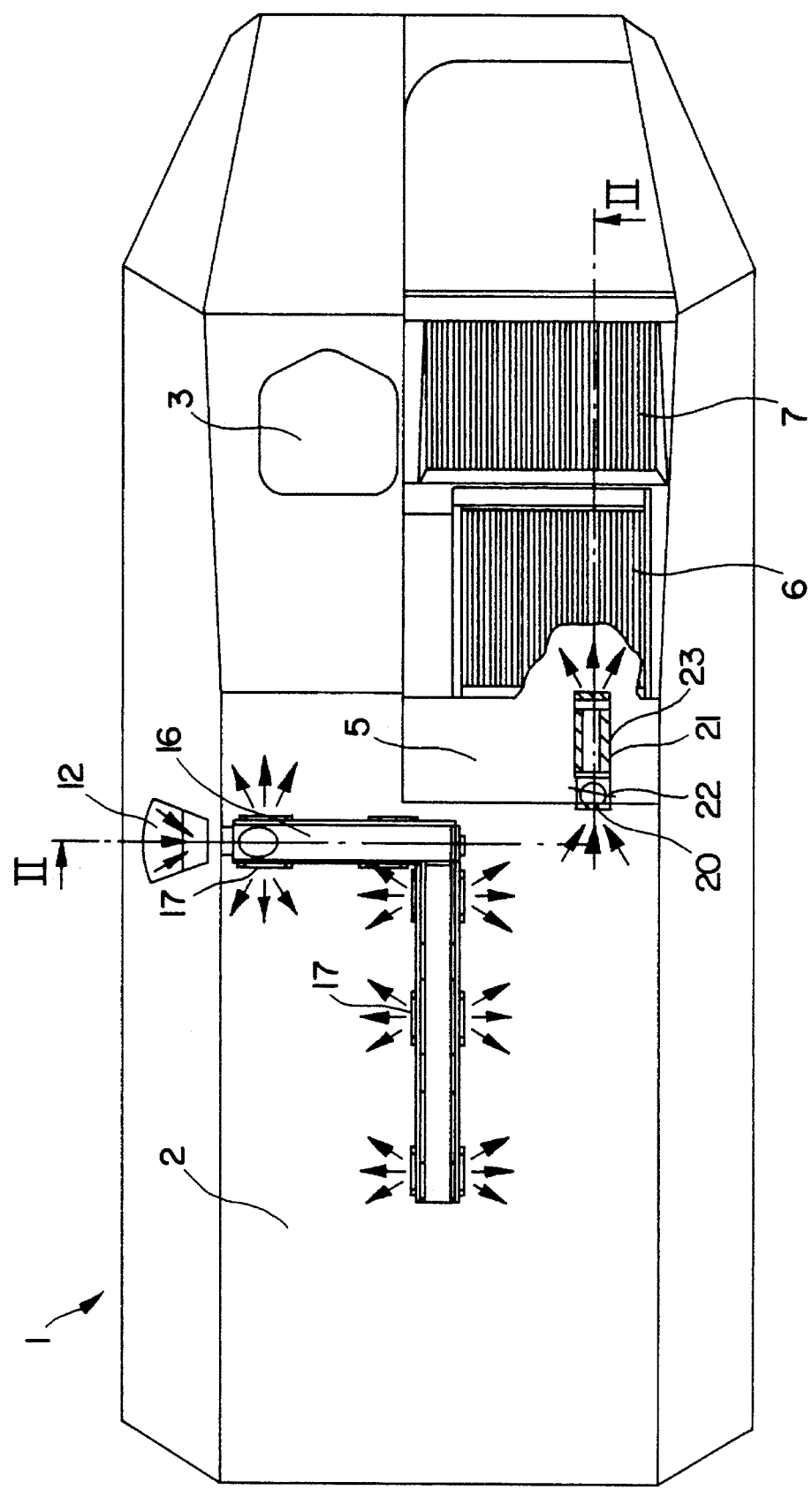
FIG. 1 shows a combat vehicle with the system according to the invention, much simplified.
Figure 2:
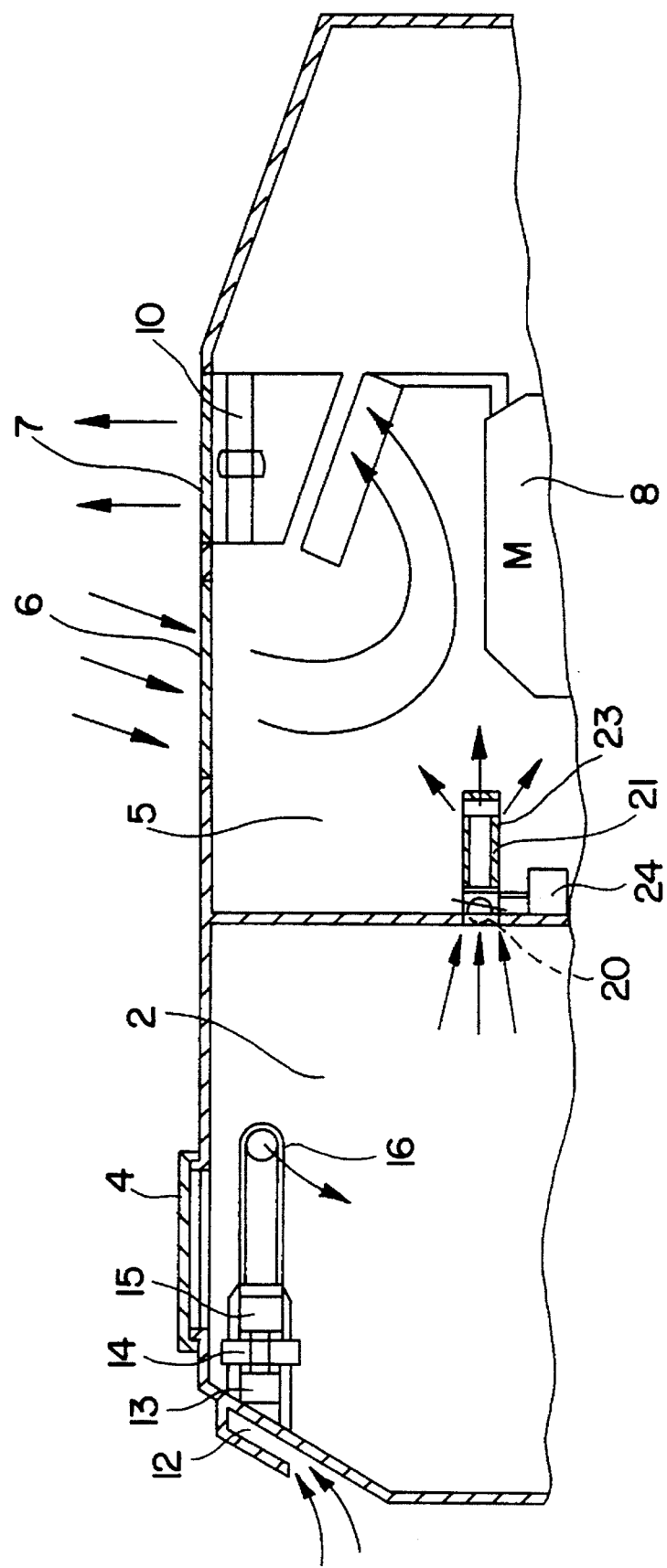
FIG. 2 shows a vertical section along II—II in FIG. 1.

In FIGS. 1 and 2 the body 1 of an armored personnel carrier is indicated in rough outlines. In its interior is a crew cabin 2 which extends forward to the driver seat 3 and can be tightly sealed on top by means of a cover 4.

Next to the driver seat 3 is the engine room 5 which is completely separated from the crew cabin 2 and can be recognized outside by the air supply grill 6 and the air exhaust grill 7. In the interior of the engine room is an engine 8, which is only suggested here and may be a water-cooled engine for instance, a connected radiator 9 and a cooling blower 10. This cooling blower is very strong and has generous dimensions. The throttling effect of the air supply grill 6 produces an underpressure in the engine room 5. With an air-cooled engine an analogous blower would be provided.

At the outer wall of body 1, an air suction hood 12 is installed, from which the air is conveyed via a coarse filter 13, a blower 14 and a chemical filter 15 into the air distribution channel 16. Fresh air is then blown into the crew cabin at approximate locations from various air blowing nozzles 17.

Between crew cabin 2 and the engine room 5, a passage opening 20 is provided. A pipe socket 21 containing a butterfly valve 22 and a sound absorber 23 are connected to the passage opening.

The ventilation system operates as follows. When the butterfly valve 22 is open, the underpressure in the engine room 5 sucks used air from the crew cabin 2. When the cover 4 is open, this sucking causes possible powder gases to be removed from the crew cabin 2, if necessary even without switching on the fresh-air ventilator 14. When the cover 4 is closed, the underpressure in the engine room 5 also produces a lowering of the pressure in the crew cabin 2, thereby assisting the ventilator 14. This means that the ventilator 14 need not cover the entire pressure drop in the air filters 13, 15 and in the air distribution channel 16 with blowing nozzles 17. Therefore, the ventilator 14 need only be designed for a relatively low pressure increase which makes it possible to use an axial ventilator. Axial ventilators are characterized by low space requirement, i.e., a short length in the flow direction, and high air throughput but their pressure increase is limited.

The pipe socket 21 connected to the passage opening 20 also contains a sound absorber 23 so that the noise of the engine room cannot penetrate into the crew cabin 2. The butterfly valve 22 is closed by the control element 24 when the engine is shut off or when the air pressure in the engine room rises. However, the butterfly valve 22 can also be made in the form of a non-return valve or some other type of safety valve which closes automatically when the pressure in the engine room rises.

While the invention has been described by reference to a specific embodiment, this was for purposes of illustration only. Numerous alternative embodiments will be apparent to those skilled in the art and are considered to be within the scope of the invention.

I claim:

1. A system for the ventilation of a crew cabin of a combat vehicle having an engine room separated from the crew cabin, comprising a radiator located in said engine room, a sucking cooling blower connected to the output of said radiator for sucking air out of said engine room, an air suction and cleaning apparatus located in said crew cabin having a ventilator and an opening for sucking in fresh air from outside, an air distribution channel connected to an output of said air suction and cleaning apparatus in said crew cabin, a plurality of blowing nozzles disposed on said air distribution channel for delivering said fresh air to said crew cabin, and a sealable passage opening located between said crew cabin and said engine room for selectively admitting used air from said crew cabin to said engine room.

2. The ventilation system of claim 1, wherein said ventilator is an axial ventilator.

3. The ventilation system of claim 1, further comprising a sound absorber located adjacent to said passage opening.

4. The ventilation system of claim 1, further comprising a valve connected to said passage opening in said engine room, wherein said valve closes automatically if overpressure exists in the engine room.

5. The ventilation system of claim 4 wherein said valve comprises a butterfly valve.

6. The ventilation system of claim 1, further comprising a valve connected to said passage opening in said engine room, wherein said valve closes automatically when said engine is shut off.

7. The ventilation system of claim 6 wherein said valve comprises a butterfly valve.

8. The ventilation system of claim 1 wherein said air suction and cleaning apparatus includes a filter.

9. The ventilation system of claim 8 wherein said air suction and cleaning apparatus includes a chemical filter.

\* \* \* \* \*